United States Patent
Kasonde et al.

(10) Patent No.: US 12,065,885 B2
(45) Date of Patent: Aug. 20, 2024

(54) CUTTING ELEMENT AND METHODS OF MAKING THE SAME

(71) Applicant: Element Six (UK) Limited, Oxfordshire (GB)

(72) Inventors: Maweja Kasonde, Oxfordshire (GB); Roger William Nigel Nilen, Oxfordshire (GB); Richard Stuart Balmer, Oxfordshire (GB)

(73) Assignee: Element Six (UK) Limited, Didcot (GB)

( * ) Notice: Subject to any disclaimer, the term of this patent is extended or adjusted under 35 U.S.C. 154(b) by 81 days.

(21) Appl. No.: 17/613,815

(22) PCT Filed: Jun. 3, 2020

(86) PCT No.: PCT/EP2020/065302
§ 371 (c)(1),
(2) Date: Nov. 23, 2021

(87) PCT Pub. No.: WO2020/245165
PCT Pub. Date: Dec. 10, 2020

(65) Prior Publication Data
US 2022/0228444 A1    Jul. 21, 2022

(30) Foreign Application Priority Data
Jun. 4, 2019  (GB) .................................... 1907970

(51) Int. Cl.
*E21B 10/56*   (2006.01)
*B23B 27/14*   (2006.01)
*E21B 10/567*  (2006.01)

(52) U.S. Cl.
CPC .......... *E21B 10/5673* (2013.01); *B23B 27/14* (2013.01); *B23B 2226/315* (2013.01)

(58) Field of Classification Search
CPC ..... E21B 10/46; E21B 10/5673; B23B 27/14; B23B 2226/315
See application file for complete search history.

(56) References Cited

U.S. PATENT DOCUMENTS

2002/0020565 A1*  2/2002  Hart ........................ E21B 10/43
                                                                     175/398
2005/0247492 A1   11/2005  Shen et al.
(Continued)

FOREIGN PATENT DOCUMENTS

CN      205778558 U     12/2016
GB        2519671 A      4/2015
(Continued)

OTHER PUBLICATIONS

International Search Report and Written Opinion issued for PCT/EP2020/065302, dated Aug. 26, 2020 (15 pages).
(Continued)

*Primary Examiner* — Cathleen R Hutchins
(74) *Attorney, Agent, or Firm* — Armstrong Teasdale LLP

(57) ABSTRACT

A cutting element (30) includes a substrate (40); and a body of superhard polycrystalline material (34) bonded to the substrate (40) along an interface, the body of superhard polycrystalline material having a peripheral side edge (42). The body of superhard polycrystalline material has a cutting surface (34); a plurality of spaced apart cutting edges (36) extending to the cutting surface (34) through respective chamfer portions (38), the cutting edges being spaced around the peripheral side edge; a plurality of recesses/regions (48) extending from the cutting surface (34) towards the substrate, adjacent cutting edges (36) being spaced apart by a respective one of said recesses/regions (48); and a protrusion or recessed region extending from the cutting surface about a central longitudinal axis of the cutting
(Continued)

element. A method of making such a cutting element is also disclosed.

19 Claims, 3 Drawing Sheets

(56) References Cited

U.S. PATENT DOCUMENTS

| | | |
|---|---|---|
| 2010/0059287 A1 | 3/2010 | Durairajan et al. |
| 2013/0199856 A1 | 8/2013 | Bilen et al. |
| 2013/0209184 A1* | 8/2013 | Barry .................. B23P 15/34 407/53 |
| 2018/0148978 A1 | 5/2018 | Chen |
| 2019/0106943 A1 | 4/2019 | Tilleman et al. |

FOREIGN PATENT DOCUMENTS

| | | |
|---|---|---|
| WO | 2018122166 A1 | 7/2018 |
| WO | 2018122309 A1 | 7/2018 |

OTHER PUBLICATIONS

Combined Search and Examination Report issued for GB1907970.6, dated Nov. 26, 2019 (6 pages).
Combined Search and Examination Report issued for GB2008331.7, dated Nov. 27, 2020 (5 pages).

\* cited by examiner

CUTTING ELEMENT AND METHODS OF MAKING THE SAME

CROSS REFERENCE TO RELATED APPLICATIONS

This application is a U.S. national stage entry under 35 U.S.C. § 371 of PCT/EP2020/065302 filed on Jun. 3, 2020 which claims priority to GB 1907970.6 filed on Jun. 4, 2019, both of which are incorporated by reference in their entirety for all purposes.

FIELD

This disclosure relates generally to a cutting element, for example formed of a super-hard polycrystalline construction that may be used, for example, as a cutting element for drilling in the oil and gas industry or as an insert for machine tools, and to methods for making the same.

BACKGROUND

In various fields such as earth-boring, road milling, and mining tough materials such as rock, asphalt, or concrete are engaged and degraded using cutting elements that are typically coupled to a movable body such as a drill bit secured to a drill string to bring the cutting elements into contact with the material to be degraded as the body moves. For example, when exploring for or extracting subterranean oil, gas, or geothermal energy deposits, a plurality of cutting elements are typically secured to a drill bit attached to the end of a drill string and as the drill bit is rotated, the cutting elements degrade a subterranean formation forming a well-bore, which allows the drill bit to advance through the formation. In another example, when preparing an asphalt road for resurfacing, cutting elements are typically coupled to tips of picks that may be connected to a rotatable drum. As the drum is rotated, the cutting elements degrade the asphalt leaving a surface ready for application of a fresh layer.

The cutting elements used in such applications often include super-hard materials, such as polycrystalline diamond material, sintered to a substrate material such as tungsten carbide, in a high-pressure, high-temperature environment. These cutting elements typically include a cutting edge formed in the super-hard material designed to scrape against and shear away a surface. While effective in cutting formation or other materials, such cutting elements may be susceptible to chipping, cracking, or partial fracturing when subjected to high forces.

In, for example, drilling operations, a cutting element, also termed an insert, is subjected to heavy loads and high temperatures at various stages of its useful life. In the early stages of drilling, when the sharp cutting edge of the insert contacts the subterranean formation, it is subjected to large contact pressures. This results in the possibility of a number of fracture processes such as fatigue cracking being initiated. As the cutting edge of the insert wears, the contact pressure decreases and is generally too low to cause high energy failures. However, this pressure can still propagate cracks initiated under high contact pressures and may eventually result in spalling-type failures. In the drilling industry, PCD cutter performance is determined by a cutter's ability to achieve high penetration rates in increasingly demanding environments, and still retain a good condition post-drilling (enabling re-use if desired). In any drilling application, cutters may wear through a combination of smooth, abrasive type wear and spalling/chipping type wear. Whilst a smooth, abrasive wear mode is desirable because it delivers maximum benefit from the highly wear-resistant PCD material, spalling or chipping type wear is unfavourable. Even fairly minimal fracture damage of this type can have a deleterious effect on both cutting life and performance.

Cutting efficiency may be rapidly reduced by spalling-type wear as the rate of penetration of the drill bit into the formation is slowed. Once chipping begins, the amount of damage to the diamond table continually increases, as a result of the increased normal force required to achieve a given depth of cut. Therefore, as cutter damage occurs and the rate of penetration of the drill bit decreases, the response of increasing weight on bit may quickly lead to further degradation and ultimately catastrophic failure of the chipped cutting element.

It has been appreciated that cutting elements and machine tool cutting inserts having cutting surfaces with non-planar, shaped topographies or topologies may be advantageous in various applications. In particular, the surface features and/or shape of the cutting surface may be beneficial in use to divert, for example, chips from the working surface being worked on by the cutter or machine tool, and/or in some instances to act as a chip breaker, with a view to reducing the risk of chipping, or cracking, thereby extending the working life of the cutting element.

There is a need to provide super-hard inserts such as inserts for cutting or machine tools having effective performance and enhanced resistance to chipping or spalling.

SUMMARY

Viewed from a first aspect there is provided a cutting element comprising:
  a substrate; and
  a body of superhard polycrystalline material bonded to the substrate along an interface, the body of superhard polycrystalline material having a peripheral side edge; wherein:
  the body of superhard polycrystalline material comprises:
  a cutting surface;
  a plurality of spaced apart cutting edges extending to the cutting surface through respective chamfer portions, the cutting edges being spaced around the peripheral side edge;
  a plurality of recesses/regions extending from the cutting surface towards the substrate, adjacent cutting edges being spaced apart by a respective one of said recesses/regions; and
  a recessed region extending from the cutting surface about a central longitudinal axis of the cutting element.

Viewed from a second aspect there is provided a method of making the cutting element defined above comprising:
  providing a mass of particles or grains of superhard material to form a pre-sinter assembly; and
  treating the pre-sinter assembly in the presence of a catalyst/solvent material for the superhard grains at an ultra-high pressure of around 5.5 GPa or greater and a temperature at which the superhard material is more thermodynamically stable than graphite to sinter together the grains of superhard material to form the cutting element.

Viewed from a yet further aspect there is provided a drill bit or a component of a drill bit for boring into the earth, comprising one or more of the above defined cutting elements.

In examples where the insert is used as a cutting element, for example for drilling in the oil and gas industry, the shape of the cutting element and any surface topography may be used to direct or divert the rock or earth away from the drill bit to which the cutter is attached. Alternatively or additionally, for such uses or when used as an insert for a machine tool for machining a workpiece, the shape and surface topography may act as a chip breaker suitable for controlling aspects of the size and shape of chips formed in use.

BRIEF DESCRIPTION OF THE DRAWINGS

Various examples are now described with reference to the accompanying drawings in which.

DETAILED DESCRIPTION

Figure 1:
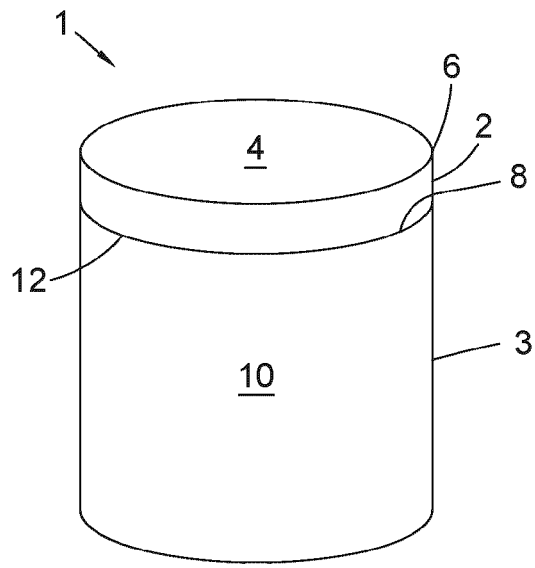
FIG. 1 is a schematic drawing of a conventional PCD compact comprising a PCD structure bonded to a substrate.

Referring in general to the following description and accompanying drawings, various versions of the present disclosure are described and illustrated to show its structure and method of operation. Common elements of the illustrated examples are designated by the same reference numerals.

As used herein, "drill bit" means and includes any type of bit or tool used for drilling during the formation or enlargement of a wellbore in subterranean formations and includes, for example, fixed cutter bits, rotary drill bits, percussion bits, core bits, eccentric bits, bi-center bits, reamers, mills, drag bits, roller cone bits, hybrid bits and other drilling bits and tools known in the art.

As used herein, a "superhard material" is a material having a Vickers hardness of at least about 28 GPa. Diamond and cubic boron nitride (cBN) material are examples of superhard materials.

As used herein, a "superhard construction" means a construction comprising a body of polycrystalline superhard material. In such a construction, a substrate may be attached thereto.

As used herein, polycrystalline diamond (PCD) is a type of polycrystalline superhard (PCS) material comprising a mass of diamond grains, a substantial portion of which are directly inter-bonded with each other and in which the content of diamond is at least about 80 volume percent of the material. In one example of PCD material, interstices between the diamond grains may be at least partly filled with a binder material comprising a catalyst for diamond. As used herein, "interstices" or "interstitial regions" are regions between the diamond grains of PCD material. In examples of PCD material, some or all interstices or interstitial regions may be substantially or partially filled with a material other than diamond, or they may be substantially empty. PCD material may comprise at least a region from which catalyst material has been removed from the interstices, leaving interstitial voids between the diamond grains.

Cutter elements for use in drill bits in the oil and gas industry typically comprise a layer of polycrystalline diamond (PCD) bonded to a cemented carbide substrate. PCD material is typically made by subjecting an aggregated mass of diamond particles or grains to an ultra-high pressure of greater than about 5 GPa, and temperature of at least about 1200° C., typically about 1440° C., in the presence of a sintering aid, also referred to as a solvent-catalyst material for diamond. Solvent-catalyst materials for diamond are understood to be materials that are capable of promoting direct inter-growth of diamond grains at a pressure and temperature condition at which diamond is thermodynamically more stable than graphite.

Examples of solvent-catalyst materials for diamond are cobalt, iron, nickel and certain alloys including alloys of any of these elements.

As used herein, PCBN (polycrystalline cubic boron nitride) material refers to a type of superhard material comprising grains of cubic boron nitride (cBN) dispersed within a matrix comprising metal or ceramic.

The term "substrate" as used herein means any substrate over which the superhard material layer is formed. For example, a "substrate" as used herein may be a transition layer formed over another substrate.

The superhard construction shown in the figures may be suitable, for example, for use as a cutter insert for a drill bit for boring into the earth. Such an earth-boring drill bit (not shown) includes a plurality of cutting elements, and typically includes a bit body which may be secured to a shank by way of a threaded connection and/or a weld extending around the earth-boring drill bit on an exterior surface thereof along an interface between the bit body and the shank. A plurality of cutting elements are attached to a face of the bit body, one or more of which may comprise a cutting element as described herein in further detail below.

Figure 2:
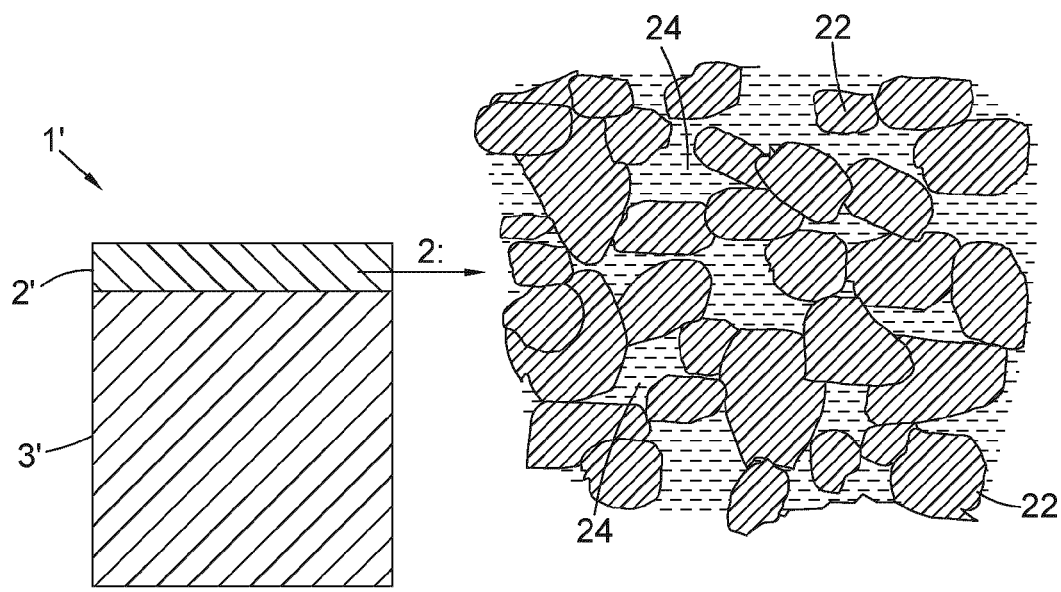
FIG. 2 is a schematic drawing of the microstructure of a conventional body of PCD material.

FIGS. 1 and 2 show a conventional polycrystalline composite construction 1, 1' for use as a cutter insert for a drill bit (not shown) for boring into the earth. The polycrystalline composite compact or construction 1, 1' comprises a body of polycrystalline super hard material 2, 2' integrally bonded at an interface 12 to a substrate 10. The super hard material may be, for example, polycrystalline diamond (PCD) and the super hard particles or grains may be of natural or synthetic origin. The substrate 10 may be formed of a hard material such as a cemented carbide material and may be, for example, cemented tungsten carbide. The binder metal for such carbides suitable for forming the substrate 10 may be, for example, nickel, cobalt, iron or an alloy containing one or more of these metals. Typically, this binder will be present in an amount of 10 to 20 mass %, but this may be as low as 6 mass % or less. Some of the binder metal may infiltrate the body of polycrystalline super hard material 2, 2'during formation of the compact 1, 1'.

As shown in FIG. 2, during formation of the polycrystalline composite construction 1, 1', the interstices 24 between the grains 22 of super hard material such as diamond grains in the case of PCD, may be at least partly filled with a non-super hard phase material. This non-super hard phase material, also known as a filler material may comprise residual catalyst/binder material, for example cobalt, nickel or iron.

The polycrystalline composite construction 1, 1' when used as a cutting element may be mounted in use in a bit body, such as a drag bit body (not shown).

The substrate 10 may be, for example, generally cylindrical having a peripheral surface 3, a peripheral top edge 8 and a distal free end.

The exposed surface of the super hard material 4 opposite the substrate 10 forms or comprises a working surface which also acts as a rake face in use. In some conventional cutting elements such as that shown in FIG. 3, a chamfer 28 typically extends between the working surface 4 and a cutting edge 6, and at least a part of a flank or barrel 2 of the cutting element, the cutting edge 36 being defined by the edge of the chamfer 28 and the flank 2.

The working surface or "rake face" 4 of the polycrystalline composite construction 1, 1' is the surface or surfaces over which the chips of material being cut flow when the cutter is used to cut material from a body, the rake face 4 directing the flow of newly formed chips. This face 4 is commonly also referred to as the top face or working surface of the cutting element as the working surface 4 is the surface which, along with its edge 6, is intended to perform the cutting of a body in use. It is understood that the term "cutting edge", as used herein, refers to the actual cutting edge, defined functionally as above, at any particular stage or at more than one stage of the cutter wear progression up to failure of the cutter, including but not limited to the cutter in a substantially unworn or unused state.

As used herein, "chips" are the pieces of a body removed from the work surface of the body being cut by the polycrystalline composite construction 1, 1' in use.

As used herein, the "flank" 2 of the cutter is the surface or surfaces of the cutter that passes over the surface produced on the body of material being cut by the cutter and is commonly referred to as the side or barrel of the cutter. The flank 2 may provide a clearance from the body and may comprise more than one flank face.

As used herein, a "wear scar" is a surface of a cutter formed in use by the removal of a volume of cutter material due to wear of the cutter. A flank face may comprise a wear scar. As a cutter wears in use, material may progressively be removed from proximate the cutting edge, thereby continually redefining the position and shape of the cutting edge, rake face and flank as the wear scar forms.

Figure 3:
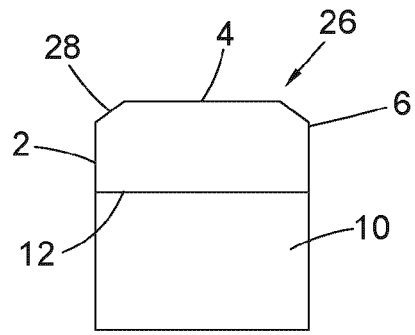
FIG. 3 is a schematic drawing of a conventional PCD compact comprising a PCD structure bonded to a substrate having a chamfered peripheral edge to act as a cutting edge.

With reference to FIG. 3, the chamfer 28 is formed in the structure adjacent the cutting edge 6 and flank or barrel surface 2.

The rake face 4 is joined to the flank 2 by the chamfer 28 which extends from the cutting edge 6 to the rake face 4, and lies in a plane at a predetermined angle to the plane perpendicular to the plane in which the longitudinal axis of the cutter extends. In some examples, this chamfer angle is up to around 45 degrees. The vertical height of the chamfer 28 may be, for example, between 350 μm and 450 μm, such as around 400 μm.

The conventional cutting elements shown in FIG. 1 to 3 are typically cylindrical in shape with a substantially planar cutting surface 4.

Figure 4:
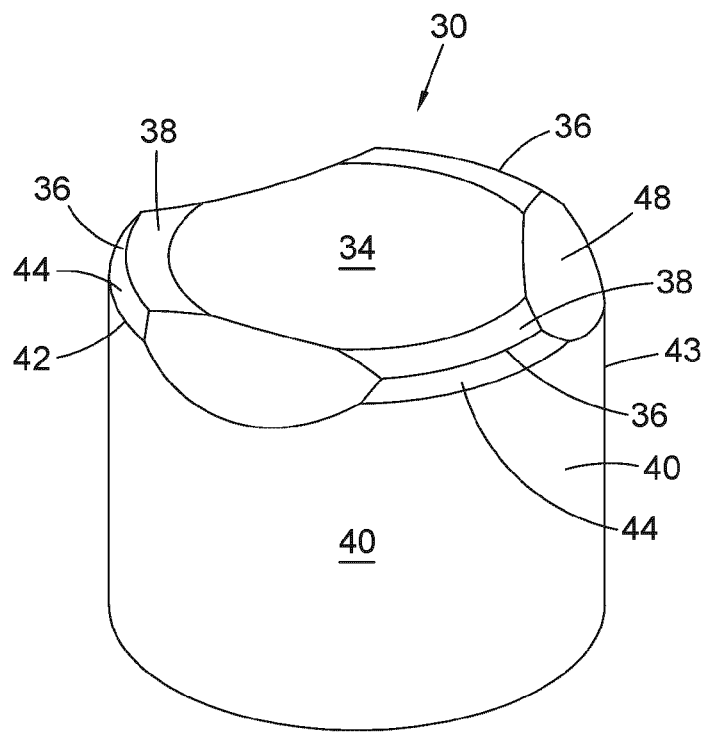
FIG. 4 is a schematic perspective view from above of a PCD cutter according to an example.

A cutting element 30 according to an example is shown in FIG. 4 and comprises a body of polycrystalline super hard material 44 integrally bonded at an interface to a substrate 40. The super hard material 44 may be, for example, polycrystalline diamond (PCD) and the super hard particles or grains may be of natural or synthetic origin.

The substrate 40 may be formed of a hard material such as a cemented carbide material and may be, for example, cemented tungsten carbide, cemented tantalum carbide, cemented titanium carbide, cemented molybdenum carbide or mixtures thereof. The binder metal for such carbides suitable for forming the substrate 40 may be, for example, nickel, cobalt, iron or an alloy containing one or more of these metals. Typically, this binder will be present in an amount of 10 to 20 mass %, but this may be as low as 6 mass % or less.

The substrate 40 may be, for example, generally cylindrical having a peripheral surface 43, a peripheral top edge and a distal free end.

The exposed surface 34 of the super hard material 44 opposite the substrate 40 forms or comprises a working surface which also acts as a rake face in use. This working surface has a central portion which is substantially non-planar and may, in some examples, be concave, or convex. A plurality of cutting edges 36 are spaced from one another around the peripheral surface of the body of superhard material 44 and are formed by the bottom of a respective chamfer portion 38 extending between the working surface 34 and at least a part of a flank or barrel 42 of the body of superhard material forming the cutting element 30, the cutting edges 36 being defined by the edge of the chamfer 38 and the flank 42.

The cutting edges 36 are spaced from each other by regions 48 which extend from the working face 34 towards and in some examples to and into the substrate 40. One or more of the regions 48 may be a concavity into the body of superhard material and in some examples into the substrate 40.

In some examples, one or more of the regions 48 may extend from the working face 34 to a position between around 0.5 mm to around 2 mm below the interface between the substrate 40 and the body of super hard material 44.

In some examples, the depth along a central longitudinal axis of the cutting element 30 of the concave central feature in the working surface 34 may be up to around 1 mm. In examples where the central feature is convex, the height along a central longitudinal axis of the cutting element 30 of the convex central feature protruding from the working surface 34 may be up to around 1 mm.

Figure 5:
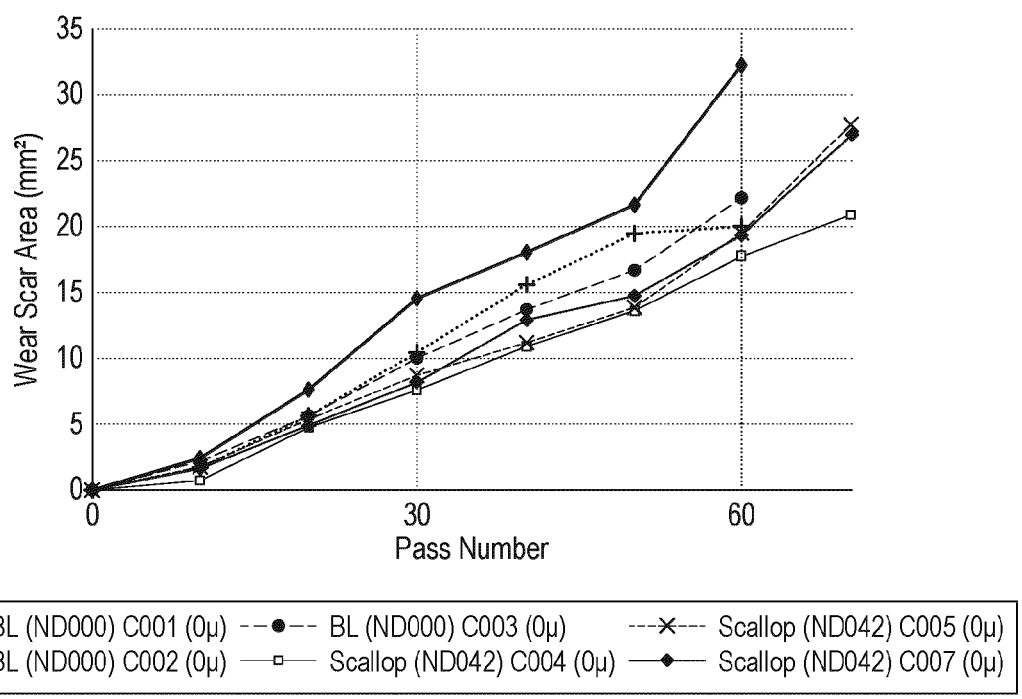
FIG. 5 is a plot showing the results of a vertical borer test comparing an example super hard construction with a conventional PCD cutter element.

The wear resistance of the example cutting elements 30 were tested against a conventional polycrystalline diamond cutting element having the same average grain size of diamond grains as the super hard grains in the example construction 30 and sintered under pressure of around 6.8 GPa. The tests performed included vertical boring mill tests. The results are shown in FIG. 5 and provide an indication of the total wear scar area plotted against cutting length. It was seen that the wear resistance of the example constructions was better than that of the conventional PCD cutting element bonded to a WC substrate in which the PCD layer had the same average grain size as the PCD layer of the examples and same PCD layer thickness. None of the cutting elements had been subjected to an acid leaching treatment to remove residual catalyst from the PCD regions.

An example method of preparing the cutting element of FIG. 4 is as follows. A pre-sinter mixture was prepared by combining a mass of diamond particles with a non-diamond phase mixture designed to act as a solvent/catalyst for diamond, such as cobalt, and to form up to around 20 wt % in the sintered product. The pre-sinter mixture was loaded into a cup and placed in an HP/HT reaction cell assembly together with a mass of carbide to form the substrate. The contents of the cell assembly were subjected to HP/HT processing. The HP/HT processing conditions selected were sufficient to effect inter-crystalline bonding between adjacent grains of diamond particles and the joining of sintered particles to the cemented metal carbide support to form a PCD construction comprising a PCD structure integrally formed on and bonded to the cemented tungsten carbide substrate. In one example, the processing conditions generally involved the imposition for about 3 to 120 minutes of a temperature of at least about 1200 degrees C. and a super high pressure of greater than about 5 GPa. In some examples, the pre-sinter assembly may be subjected to a pressure of at least about 6 GPa, at least about 6.5 GPa, at least about 7 GPa or even at least about 7.5 GPa or more, at a temperature of around 1440 deg C.

In some examples, both the bodies of, for example, diamond and carbide material plus sintering aid/binder/catalyst are applied as powders and sintered simultaneously in a single UHP/HT process.

In another example, the substrate may be pre-sintered in a separate process before being bonded to the superhard material in the HP/HT press during sintering of the superhard polycrystalline material.

In some examples, the cemented carbide substrate 40 may be formed of tungsten carbide particles bonded together by the binder material, the binder material comprising an alloy of any one or more of Co, Ni and Cr. The tungsten carbide particles may form at least 70 weight percent and at most 95 weight percent of the substrate.

After sintering, the PCD construction 30 was subjected to further treatment to remove the canister material.

In some examples, the canister may be shaped to create one or more of the concave or convex central portion in the working surface 34, the chamfers 38 to create the cutting edges 36 and the regions 48. In other examples, any one or more of the concave or convex central portion in the working surface 34, the chamfers 38 to create the cutting edges 36 and the regions 48 may be created after sintering using additional processing such as laser ablation, EDM machining another machining process to shape the construction to the desired cutting element shape and size. Additionally, laser ablation of different regions of the superhard material 44/working surface 34 may be used to create regions of different surface roughness, for example by ablating using different laser parameters. This may be used, as desired, to influence chip flow across the working surface 34 during the cutting application.

The number, depth and dimensions of the recesses/regions 48 and discrete cutting edges 36 may be chosen to suit the desired application.

In the examples where the body of superhard material 4 comprises PCD, the PCD material may be, for example, formed of diamond grains that are of natural and/or synthetic origin.

The cutting elements 30 of the type shown in FIG. 4 may be provided along blades on the face of a drill bit body (not shown). The cutting elements may be secured to the bit body within pockets therein using, for example a conventional brazing process.

In some examples, the example constructions may be subjected to an acid leaching treatment to remove the residual catalyst from interstitial spaces between the grains of superhard material.

In use, the cutting element 30 shears away the surface of the underlying formation and wear scar forms progressively in the superhard material in the region of the cutting edge 36. As used herein, a "wear scar" is a surface of the cutter formed in use by the removal of a volume of cutter material due to wear of the cutter. As a cutter wears in use, material may progressively be removed from proximate the cutting edge, thereby continually redefining the position and shape of the cutting edge, rake face and flank as the wear scar forms.

Whilst not wishing to be bound by a particular theory, the example cutting elements are believed to assist in providing improved rock cutting efficiency over conventional PCD cutters, as the geometry of the cutting-edges 36 between the recessed regions 48 is such that the wear scar area will grow at a far slower rate than for a conventional cylindrical PCD cutter. This is believed to assist in maintaining a greater load at the cutter-rock contact point for a longer period, resulting in a slower build up of thermal loading, both of which are believed to be contributors to more efficient rock cutting. Also, the ploughing effect of the recessed regions 48 may assist in providing more efficient removal of the rock cuttings and chips.

In some examples, the recesses/regions 48 may be curved, such as concave, or have a radius of curvature such that they are substantially planar across their surface. Also, in some examples, the recesses/regions 48 do not extend to the interface with the substrate 40 but terminate in the body of superhard material 44.

In some examples, the cutting elements may have a generally cylindrical shape. In other examples, the cutting elements be a different shape, such as conical, or ovoid.

In some examples, the body of PCD material may be formed as a standalone object, that is, a free-standing unbacked body of PCD material, and may be attached to a substrate in a subsequent step.

In some examples, the cutting elements may comprise natural or synthetic diamond material, or cBN material. Examples of diamond material include polycrystalline diamond (PCD) material, thermally stable PCD material, crystalline diamond material, diamond material made by means of a chemical vapour deposition (CVD) method or silicon carbide bonded diamond. An example of cBN material is polycrystalline cubic boron nitride (PCBN).

It will therefore be seen that various versions of the present disclosure include cutting elements and methods of forming same for earth-boring drill bits which may enhance the working life of the cutting elements by one or more of improving the abrasion resistance, thermal stability, durability, sharpness of the cutting edge, spall resistance, and fracture/impact resistance, potentially by cutting the rock more efficiently through the rock crushing action and control of chip and drilling mud flow through the shapes/topography of the cutting elements and may lead to improved drill bit stability of, for example, the earth-boring drill bit to which the cutting elements may be mounted.

Although the foregoing description contains many specifics, these are not to be construed as limiting the scope of the present disclosure, but merely as providing certain exemplary versions.

The invention claimed is:

1. A cutting element comprising:
   a substrate; and
   a body of superhard polycrystalline material bonded to the substrate along an interface, the body of superhard polycrystalline material having a peripheral side edge;
   wherein:
   the body of superhard polycrystalline material comprises:
      a cutting surface;
      a plurality of spaced apart cutting edges extending to the cutting surface through respective chamfer portions, the cutting edges being spaced around the peripheral side edge;
      a plurality of recesses/regions extending from the cutting surface towards the substrate, adjacent cutting edges being spaced apart by a respective one of said recesses/regions; and
      a central recessed region extending from the cutting surface towards the substrate, the central recessed region extending about a central longitudinal axis of the cutting element; wherein the plurality of recesses/regions extend to and intersect with the central recessed region.

2. The cutting element of claim 1, wherein the body of superhard polycrystalline material comprises any one or more of polycrystalline diamond, diamond-like carbon, or cubic boron nitride of natural and/or synthetic origin.

3. The cutting element of claim 1, comprising three or more cutting edges.

4. The cutting element of claim 1, wherein one or more of the recesses/regions extend into the substrate.

5. The cutting element of claim 1, wherein one or more of the recesses/regions extend to a position between around 0.5 mm to around 2 mm below the interface with the body of superhard polycrystalline material.

6. The cutting element of claim 1, wherein any one or more of the recesses/regions extend towards the substrate terminating within the body of superhard polycrystalline material at a position spaced from the interface with the substrate.

7. The cutting element of claim 1, wherein any one or more of the recesses/regions is substantially concave.

8. The cutting element of claim 1, wherein the chamfer portions extend at an inclined angle to a plane along which the central longitudinal axis of the cutting element extends.

9. The cutting element of claim 1, wherein the body of superhard polycrystalline material comprises polycrystalline diamond material having inter-bonded diamond grains with interstitial spaces between the inter-bonded diamond grains, at least a portion of the interstitial spaces being substantially free of metal solvent catalyst material.

10. An earth-boring tool, comprising:
a body; and
at least one cutting element according to claim 1, attached to the body.

11. A method of making the cutting element of claim 1 comprising:
providing a mass of particles or grains of superhard material to form a pre-sinter assembly; and
treating the pre-sinter assembly in the presence of a catalyst/solvent material for the grains of superhard material at an ultra-high pressure of around 5.5 GPa or greater and a temperature at which the superhard material is more thermodynamically stable than graphite to sinter together the grains of superhard material to form the cutting element.

12. The method according to claim 11, wherein the step of providing a mass of grains of superhard material comprises providing a mass of diamond grains to form a body of polycrystalline diamond material.

13. The method according to claim 11, wherein the step of providing a mass of grains of superhard material comprises providing a mass of diamond grains to form a body of polycrystalline diamond material; and wherein the step of treating comprises treating the pre-sinter assembly to a temperature and pressure such that the diamond grains exhibit inter-granular bonding and define a plurality of interstitial regions therebetween, any residual catalyst/solvent material at least partially filling a plurality of the interstitial regions.

14. The method according to claim 11, wherein the step of providing a mass of grains of superhard material comprises providing a mass of diamond grains to form a body of polycrystalline diamond material; and wherein the step of treating comprises treating the pre-sinter assembly to a temperature and pressure such that the diamond grains exhibit inter-granular bonding and define a plurality of interstitial regions therebetween, any residual catalyst/solvent at least partially filling a plurality of the interstitial regions; the method further comprising treating at least a portion of the body of polycrystalline diamond material to remove residual catalyst/solvent material from the interstitial regions to form a region substantially free of the catalyst/solvent material for the polycrystalline diamond material, said portion forming a thermally stable region extending a depth from a working surface of the body of polycrystalline diamond material towards the interface with the substrate.

15. The method according to claim 11, wherein the step of treating the pre-sinter assembly comprises treating the pre-sinter assembly in a canister that is shaped to create any one or more of the plurality of spaced apart cutting edges extending to the cutting surface through respective chamfer portions, the plurality of recesses/regions extending from the cutting surface towards the substrate, or the central recessed region extending from the cutting surface about the central longitudinal axis of the cutting element.

16. The method according to claim 11, further comprising processing the cutting element after the step of treating the pre-sinter assembly to create any one or more of the plurality of spaced apart cutting edges extending to the cutting surface through respective chamfer portions, the plurality of recesses/regions extending from the cutting surface towards the substrate, or the central recessed region extending from the cutting surface about the central longitudinal axis of the cutting element; wherein the step of processing comprises using any one or more of laser ablation or EDM machining.

17. A tool comprising a cutting element according to claim 1, the tool being for cutting, milling, grinding, drilling, or rock drilling.

18. A tool comprising a cutting element according claim 1, wherein the tool comprises a rotary fixed-cutter bit for use in the oil and gas drilling industry.

19. A drill bit or a component therefor comprising the cutting element according to claim 1.

* * * * *